US009471645B2

(12) United States Patent
Aggarwal

(10) Patent No.: US 9,471,645 B2
(45) Date of Patent: Oct. 18, 2016

(54) MECHANISMS FOR PRIVATELY SHARING SEMI-STRUCTURED DATA

(75) Inventor: Charu C. Aggarwal, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1979 days.

(21) Appl. No.: 12/568,976

(22) Filed: Sep. 29, 2009

(65) Prior Publication Data

US 2011/0078143 A1     Mar. 31, 2011

(51) Int. Cl.
*G06F 17/00* (2006.01)
*G06F 17/30* (2006.01)

(52) U.S. Cl.
CPC ............................. *G06F 17/30539* (2013.01)

(58) Field of Classification Search
USPC .................................................. 707/737, 756
See application file for complete search history.

(56) References Cited

U.S. PATENT DOCUMENTS

| 2006/0274062 | A1* | 12/2006 | Zhang et al. | 345/420 |
| 2007/0203870 | A1* | 8/2007 | Saito | 706/52 |
| 2008/0162563 | A1* | 7/2008 | Gross et al. | 707/104.1 |
| 2010/0014657 | A1* | 1/2010 | Kerschbaum et al. | 380/28 |
| 2010/0205176 | A1* | 8/2010 | Ji et al. | 707/737 |
| 2010/0268719 | A1* | 10/2010 | Cormode et al. | 707/756 |
| 2010/0268725 | A1* | 10/2010 | Wang et al. | 707/765 |
| 2011/0041184 | A1* | 2/2011 | Cormode et al. | 726/26 |

OTHER PUBLICATIONS

Aggarwal, Charu C. et al., "Finding Generalized Projected Clusters in High Dimensional Spaces", ACM SIGMOD Conference, 2000, 12 pages.
Kuramochi, Michihiro et al., "Frequent Subgraph Discovery", IEEE International Conference on Data Mining (ICDM), 2001, 14 pages.
Zaki, Mohammed J. et al., "XRules: An Effective Structural Classifier for XML Data", SIGKDD Conference, 2003, 10 pages.
Zhou, Bin et al., "A Brief Survey on Anonymization Techniques for Privacy Preserving Publishing of Social Network Data", ACM SIGKDD Explorations Newsletter, vol. 10, Issue 2 (Dec. 2008), Session: Contributed articles table of contents, pp. 12-22, Year of Publication: 2008, ISSN:1931-0145, Publisher: ACM, (Section 4, 4.1), http://www.sigkdd.org/explorations/issues/10.
Zhou, Bin et al., "Preserving Privacy in Social Networks Against Neighborhood Attacks", Proceedings of the ICDE Conference, 2008, pp. 506-515.

(Continued)

*Primary Examiner* — Sherief Badawi
*Assistant Examiner* — Christopher J Raab
(74) *Attorney, Agent, or Firm* — Stephen J. Walder, Jr.; Mercedes L. Hobson

(57) ABSTRACT

Mechanisms are provided for anonymizing data comprising a plurality of graph data sets. The mechanisms receive input data comprising a plurality of graph data sets. Each graph data set comprises data for generating a separate graph from graphs associated with other graph data sets. The mechanisms perform clustering on the graph data sets to generate a plurality of clusters. At least one cluster of the plurality of clusters comprises a plurality of graph data sets. Other clusters in the plurality of clusters comprise one or more graph data sets. The mechanisms also determine, for each cluster in the plurality of clusters, aggregate properties of the cluster. Moreover, the mechanisms generate, for each cluster in the plurality of clusters, pseudo-synthetic data representing the cluster, from the determined aggregate properties of the clusters.

20 Claims, 6 Drawing Sheets

(56) References Cited

OTHER PUBLICATIONS

Aggarwal, Charu C. et al., "A Condensation Approach to Privacy Preserving Data Mining", Proceedings of the EDBT Conference, 2004, 18 pages.
Agrawal, Rakesh et al., "Fast Algorithms for Mining Association Rules", VLDB Conference, 1994, 13 pages.
Agrawal, Dakshi et al., "On the Design and Quantification of Privacy Preserving Data Mining Algorithms", Proceedings of the ACM PODS Conference, 2001, pp. 247-255.
Agrawal, Rakesh et al., "Privacy-Preserving Data Mining", Proceedings of the ACM SIGMOD Conference, 2000, pp. 439-450.
Cormode, Graham et al., "Anonymizing Bipartite Graph Data Using Safe Groupings", VLDB Conference, 2008, 12 pages.
Ferrer Sumsi, Miguel et al., "Theory and Algorithms on the Median Graph. Application to Graph-based Classification and Clustering", http://www/tesisenxarxa.net/TESIS_UAB/AVAILABLE/TDX-0212109-100250//mfs1de1.pdf, Section 7.2.1, 174 pages.
Hay, Michael et al., "Anonymizing Social Networks", Section 2.2, http://kdl.cs.umass.edu/papers/hay-et-al-tr0719.pdf, pp. 1-17.
Hay, Michael et al., "Resisting Structural Re-identification in Anonymized Social Networks", ACM, VLDB '08, Aug. 24-30, 2008, pp. 1-13.
Hlaoui, Adel et al., "Median Graph Computation for Graph Clustering", Soft Computing—A Fusion of Foundations, Methodologies and Applications, vol. 10, No. 1 / Jan. 2006, 12 pages, ISSN 1432-7643 (Print) 1433-7479 (Online), Published online: Apr. 29, 2005, Publisher: Springer-Verlag, Abstract, Sections 2.1, 3.2, http://www.dmi.usherb.ca/~hlaoui/Soft_Computing.pdf.
Lee, Jeongkyu et al., "Clustering of Video Objects by Graph Matching", Multimedia and Expo, 2005. ICME 2005. IEEE International Conference on vol. , Issue , Jul. 6-6, 2005 pp. 394-397, Publisher: IEEE, Section 4, http://www1bpt.bridpeport.edu/~jelee/pubs/icme05.pdf, 4 pages.
Liu, Kun et al., "Towards Identity Anonymization on Graphs", ACM SIGMOD Conference 2008, 14 pages.
Machanavjjhala, Ashwin et al., "I-Diversity: Privacy Beyond k-Anonymity", ICDE, 2006, pp. 1-12.
Samarati, Pierangela et al., "Protecting Privacy when Disclosing Information: k-Anonymity and Its Enforcement through Generalization and Suppression", Proceedings of the IEEE on Research in Security and Privacy, May 1998, pp. 1-19.
Verykios, Vassilios S. et al., "State-of-the-art in Privacy Preserving Data Mining", SIGMOD Record, 33(1), 2004, pp. 50-57.
Ying, Xiaowei et al., "Randomizing Social Networks: a Spectrum Preserving Approach", SIAM SDM 2008, pp. 739-750.

* cited by examiner

MECHANISMS FOR PRIVATELY SHARING SEMI-STRUCTURED DATA

BACKGROUND

The present application relates generally to an improved data processing apparatus and method and more specifically to mechanisms for privately sharing semi-structured data, such a network structure data, for example.

The problem of privacy-preserving data mining has attracted considerable attention in recent years because of increasing concerns about the privacy of the underlying data. In recent years, an important data domain which has emerged is that of graphs and structured data. Graphs are data structures used to represent complex systems using nodes and edges between nodes. An object, or a part of an object, is represented by a node and the interrelationship between two objects is represented by an edge. Many different types of data sets are naturally represented as graphs, such as Extensible Markup Language (XML) data sets, transportation network data sets, data sets representing traffic in IP networks, social network data sets, hierarchically structured data sets, and the like.

Existing work on graph privacy has focused on the problem of anonymizing nodes or edges of a single graph, in which the identity is assumed to be associated with individual nodes. There are many examples of approaches to graph privacy that have been devised. For example, R. Agrawal et al., "Privacy-Preserving Data Mining," Proceedings of the ACM SIGMOD Conference, pp. 439-450, 2000 establishes the field of privacy preserving data mining in the context of database mining. This paper describes how useful mining information can be extracted from randomized data. D. Agrawal et al. "On the Design and Quantification of Privacy Preserving Data Mining Algorithms," Proceedings of the ACM PODS Conference, pp. 247-255, 2001 describes the tradeoffs between privacy and accuracy in data mining algorithms. This paper establishes a framework for quantification of privacy in the context of information theory.

As a further example, in P. Samarati et al., "Protecting Privacy when Disclosing Information: k-Anonymity and its Enforcement Through Generalization and Suppression," Proceedings of the IEEE Symposium on Research in Security and Privacy, May 1998 involves a methodology to reduce the granularity of the data so that each individual is indistinguishable from at least k other individuals. Moreover, V. Verykios et al., "State-of-the-Art in Privacy Preserving Data Mining," SIGMOD Record 33(1): pp. 50-57, 2004 a survey of various privacy preserving data mining methodologies is provided.

A key method in privacy preserving data mining is that of k-anonymity. In the k-anonymity method, the data is transformed such that each record is indistinguishable from at least k other records in the data set. Because of this transformation, it is much more difficult to use publically available databases, or other available database, to infer the identity of the underlying data. Most k-anonymization work is focused on continuous and categorical data domains (see P. Samarati et al., discussed above).

The key techniques used for anonymization are those of generalization and suppression. In the case of a multi-dimensional data set, the process of generalization refers to reducing the granularity of representation of the underlying data. For example, instead of specifying an age attribute exactly, one may only choose to specify it as a range. In suppression, one may choose to completely remove either a record or an attribute value from a record. The idea is to reduce the granularity of representation such that a given record cannot be distinguished from at least k records in the data set. This transformed data can then be used for privacy-preserving or other mining applications.

An alternative to data generalization and suppression is that of synthetic pseudo-data generation which preserves the aggregate properties of the original data. one technique for performing such synthetic pseudo-data generation is described in C. C. Aggarwal, "A Condensation Based Approach to Privacy Preserving Data Mining," Proceedings of the EDBT Conference, pp. 183-199, 2004. The process of synthetic pseudo-data generation requires creation of groups of tightly clustered records followed by estimation of the statistical properties of each of these clusters. These estimated statistical properties are used in order to generate the data records from each of the clusters. The core idea is that while the generate data is synthetic, it preserves the aggregate properties and can therefore be used in conjunction with data mining tasks, such as classification, which are dependent upon aggregate properties of the original data.

Regardless of which anonymization technique used, it should be appreciated that these known anonymization techniques only operate on a single individual graph. That is, the anonymization technique are not applied to a plurality of graphs.

SUMMARY

In one illustrative embodiment, a method, in a data processing system, is provided for anonymizing data comprising a plurality of graph data sets. The method comprises receiving input data comprising a plurality of graph data sets. Each graph data set comprises data for generating a separate graph from graphs associated with other graph data sets. The method further comprises performing clustering on the graph data sets to generate a plurality of clusters. At least one cluster of the plurality of clusters comprises a plurality of graph data sets. Other clusters in the plurality of clusters comprise one or more graph data sets. The method also comprises determining, for each cluster in the plurality of clusters, aggregate properties of the cluster. Moreover, the method comprises generating, for each cluster in the plurality of clusters, pseudo-synthetic data representing the cluster, from the determined aggregate properties of the clusters.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
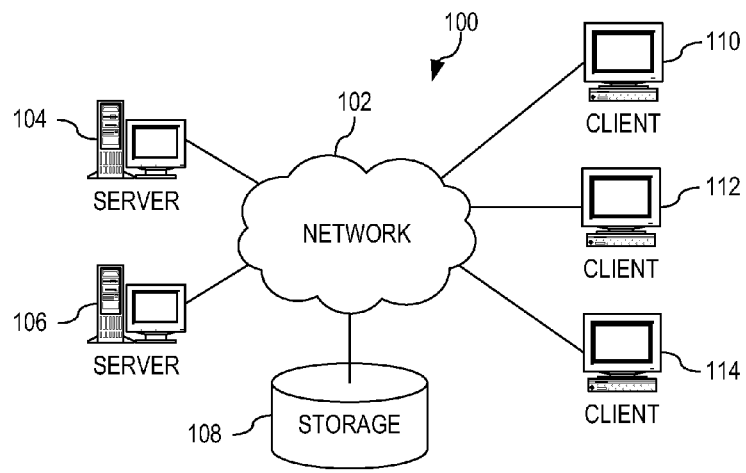
FIG. 1 is an example diagram of a distributed data processing system in which aspects of the illustrative embodiments may be implemented.

The illustrative embodiments provide a mechanism for privately sharing semi-structured data, such as network structure data. The mechanisms of the illustrative embodiments provide an anonymization mechanism to apply transformations to a plurality of graphs such that the privacy of the nodes and/or edges is maintained. The anonymization mechanism of the illustrative embodiments operates on a collection of a plurality of graphs, such as may be found in applications with semi-structured data, for example, rather than a single graph. In cases where there is semi-structured data comprising a collection of graphs, the identity is associated with entire graphs rather than portions of a single graph.

Anonymization of entire graphs is a difficult problem because information about small portions of the graph can expose the identity of the entire graph. Moreover, known methods, such as k-anonymization, are typically dependent upon some notion of proximity, which is difficult to define in the case of structured data or semi-structured data because structural similarity can often manifest itself in the form of an isomorphism which is a computationally difficult problem to begin with. Since the pairwise isomorphism problem is extremely difficult, the problem of partitioning the data into sets of similar structures (with cardinality of at least k) is even more challenging. That is, the pairwise isomorphism problem is well known to be NP-hard, while the partitioning problem is a generalization of the pairwise isomorphism problem and thus, is even more difficult (see www2.computer.org/portal/web/csdl/doi/10.1109/SFCS.2000.892080).

As a result of these difficulties, the illustrative embodiments focus on an approach which uses the aggregate properties of the collection in order to generate synthetic data which preserves these properties. While synthetic data generation techniques have been explored in the context of multi-dimensional numerical data (see C. C. Aggarwal, "A Condensation Based Approach to Privacy Preserving Data Mining," Proceedings of the EDBT Conference, pp. 183-199, 2004), there are no existing methods for the case of graph data. The format of the multi-dimensional numerical data is very different from graph data and thus, algorithms for multi-dimensional numerical data cannot be used for graph data.

For example, in the case of multi-dimensional data one can express the data as a sequence of numbers and therefore, privacy-preserving operations are very simple. This is because numerical data easily allows the computation of aggregate statistics which can be reported easily. For example, if one has a survey of households with numerical sequences corresponding to income, one can just report the mean and preserve privacy. However, there are no equivalent statistical constructs for graph structured data, which is inherently not numerical or multi-dimensional in nature. Thus, the design of a graph-structural analogue is particularly challenging because the determination of aggregate properties pose several challenges in the context of the structural behavior of graphs.

The illustrative embodiments perform the anonymization of the underlying graphs in the collection of graphs using a structural similarity approach. The key is to create clusters of similar graphs which share common structural properties. These clusters of similar graphs are used in order to construct a set of graph group super-structures. Each cluster super-structure represents the representative structure properties of the cluster of similar graphs (an example of the representative structure properties being a set of frequent sub-graphs of the original graphs). Thus, the cluster super-structures are condensed representations of the cluster of graphs. These representative structural properties of the cluster super-structures are used to generate synthetic representations of the underlying graph structures of the individual graphs in the corresponding clusters of graphs. These synthetic representations retain the aggregate properties of the underlying data and therefore, can be used for a variety of database and data mining applications.

One example of such an application is a classification application in which one has a set of instances which are labeled and one is attempting to determine the label of a particular test instance. For example, one could have the graphs describing a set of networks, some of which have been attacked by a computer virus or the like, and some that have not. One can then create a model which determines whether or not an attack has happened based on the structure of the underlying network.

Another example of an application is frequent pattern mining in which one attempts to determine the typical patterns in the underlying network. For these and other types of applications, the mechanisms of the illustrative embodiments operate to provide an effective representation of the underlying data without losing privacy.

In general, the mechanisms of the illustrative embodiments receive a set of original graphs and an anonymization level k as input. Clusters are created from the underlying graphs with the use of a structural clustering approach. Each cluster contains at least k graphs. The aggregate properties of the clusters, e.g., a set of frequent sub-graphs of a given graph collection, are computed and stored for use in generating synthetic, or pseudo-synthetic, data sets. The synthetic, or pseudo-synthetic, data sets are generated with the use of probabilistic sampling from the aggregate properties of the clusters. Since each cluster is tightly knit, the overall aggregate statistics of the data is properly maintained. The synthetic, or pseudo-synthetic, data sets may be used in conjunction with a wide variety of applications, such as those involving data mining problems which are dependent upon the aggregate properties of the original data sets of the set of original graphs.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowcharts and block diagrams in the figures described hereafter illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
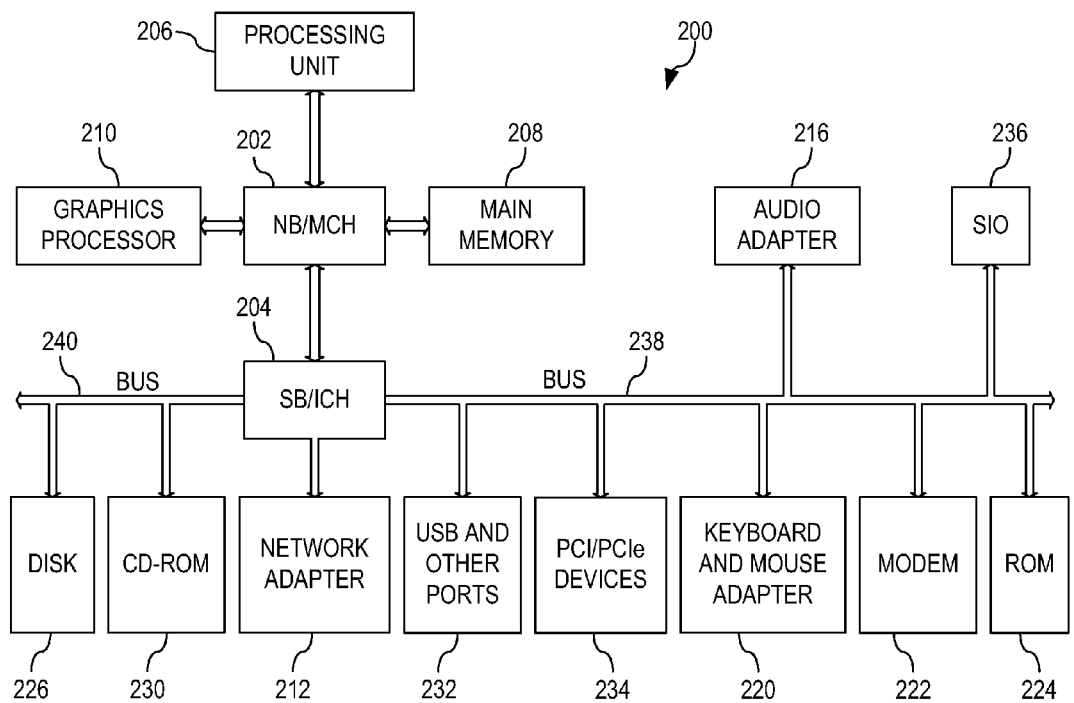
FIG. 2 is an example diagram of a data processing apparatus/device in which example aspects of the illustrative embodiments may be implemented.

With reference now to the figures, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation, this is only an example and is not intended to state or imply any limitation with regard to the features of the present invention. To the contrary, the illustrative embodiments are intended to include distributed data processing environments and other embodiments in which applications are to operate on aggregate properties of a set of graphs, for which the mechanisms described herein may be used to maintain the privacy of the underlying data sets of the set of graphs.

With reference now to the figures and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

As mentioned above, the illustrative embodiments provide mechanisms for anonymizing semi-structured data comprising a plurality of graph data sets so that the data can be shared without compromising the privacy of the data. Thus, with the mechanisms of the illustrative embodiments, the graph data sets may be stored in a permanent storage, such as the hard disk 226 in FIG. 2, and may be processed by the mechanisms of the illustrative embodiments which may be embodied, for example, in a program executing on a processor, such as processor 206 in FIG. 2, such that the graph data sets may be anonymized and used by an application that operates on aggregate characteristics of the graph data sets, e.g., a data mining application, categorization application, or the like. It should be appreciated that the mechanisms of the illustrative embodiments may be distributed over a plurality of computing devices such as shown in FIG. 1. For example, the graph data sets may be stored in a network attached storage, such as storage 108 in FIG. 1, the mechanisms of the illustrative embodiments may be implemented in a server, such as server 106, and results may be provided to a client computing device, such as client 110.

Figure 3:
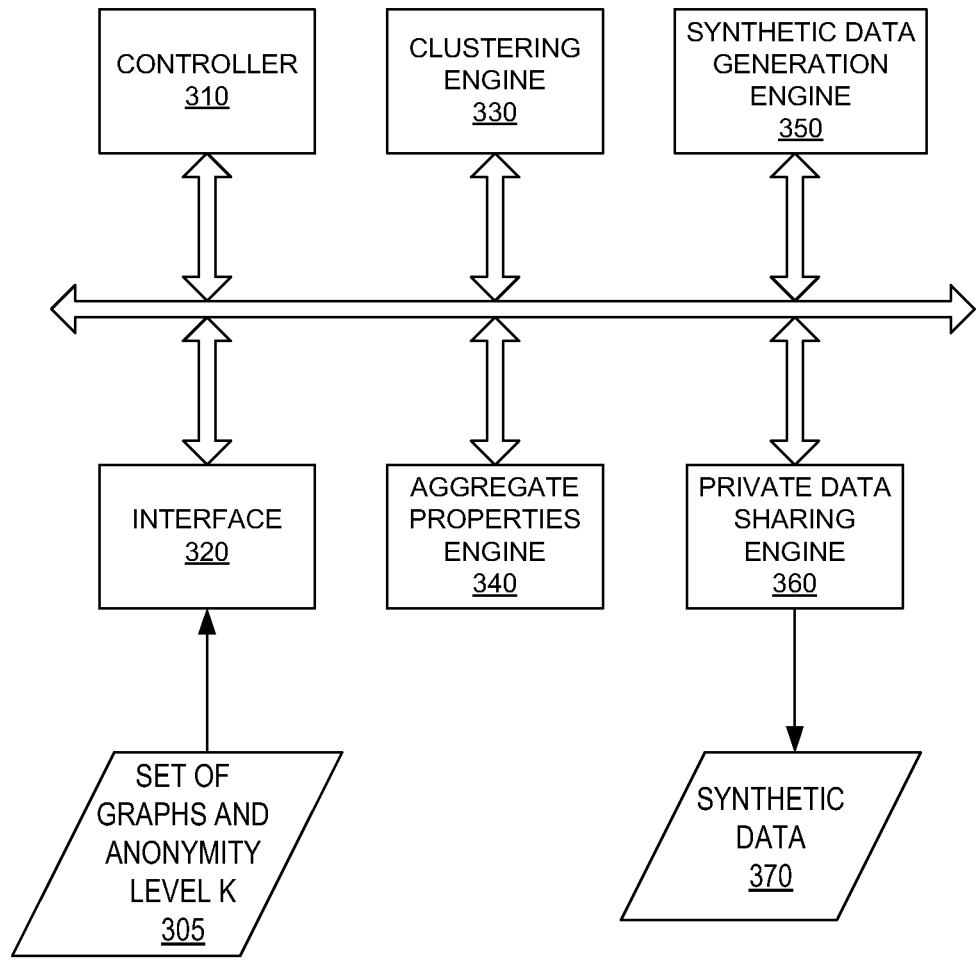
FIG. 3 is an example block diagram illustrating the primary operational elements of a graph privacy engine in accordance with one illustrative embodiment.

FIG. 3 is an example block diagram illustrating the primary operational elements of a graph privacy engine in accordance with one illustrative embodiment. The elements shown in FIG. 3 may be implemented in hardware, software, or any combination of hardware and software. In one illustrative embodiment, the elements of FIG. 3 are implemented as software executing on one or more processors of one or more data processing devices or systems.

As shown in FIG. 3, the operational components include a controller 310 that orchestrates the overall operation of the other elements 320-360. An interface 320 is provided for receiving input graph data sets and an anonymity level k 305 for performing the generation of synthetic data based on the aggregate properties determined from the clustered data points of the input graph data sets. The input graph data sets and anonymity level k are provided to the clustering engine 330 which creates clusters of graphs from the underlying input data graphs with the use of a structural clustering approach, each cluster containing at least k graphs. More details regarding the operation of the clustering engine 330 will be provided hereafter with regard to step 420 in FIG. 4 and FIG. 5.

Once the clustering is performed by the clustering engine 330, the aggregate properties engine 340 determines the aggregate properties of the clusters, e.g., a set of frequent sub-graphs of a given graph collection, which are then stored for use in generating synthetic, or pseudo-synthetic, data sets. More details regarding this operation will be provided hereafter with regard to step 430 in FIG. 4 and FIG. 6.

Having determined the aggregate properties of the clusters, the synthetic data generation engine 350 generates synthetic, or pseudo-synthetic, data sets using probabilistic sampling from the aggregate properties of the clusters. More details with regard to the operation of the synthetic data generation engine 350 will be provided hereafter with regard to step 440 in FIG. 4 and FIG. 7. The resulting synthetic, or pseudo-synthetic, data sets 370 may then be shared via the private data sharing engine 360 with other applications to achieve the purposes of the other applications while maintaining the privacy of the original graph data sets. The synthetic, or pseudo-synthetic, data sets 370 may be used in conjunction with a wide variety of applications, such as those involving data mining problems, which are dependent upon the aggregate properties of the original data sets of the set of original graphs.

Figure 4:
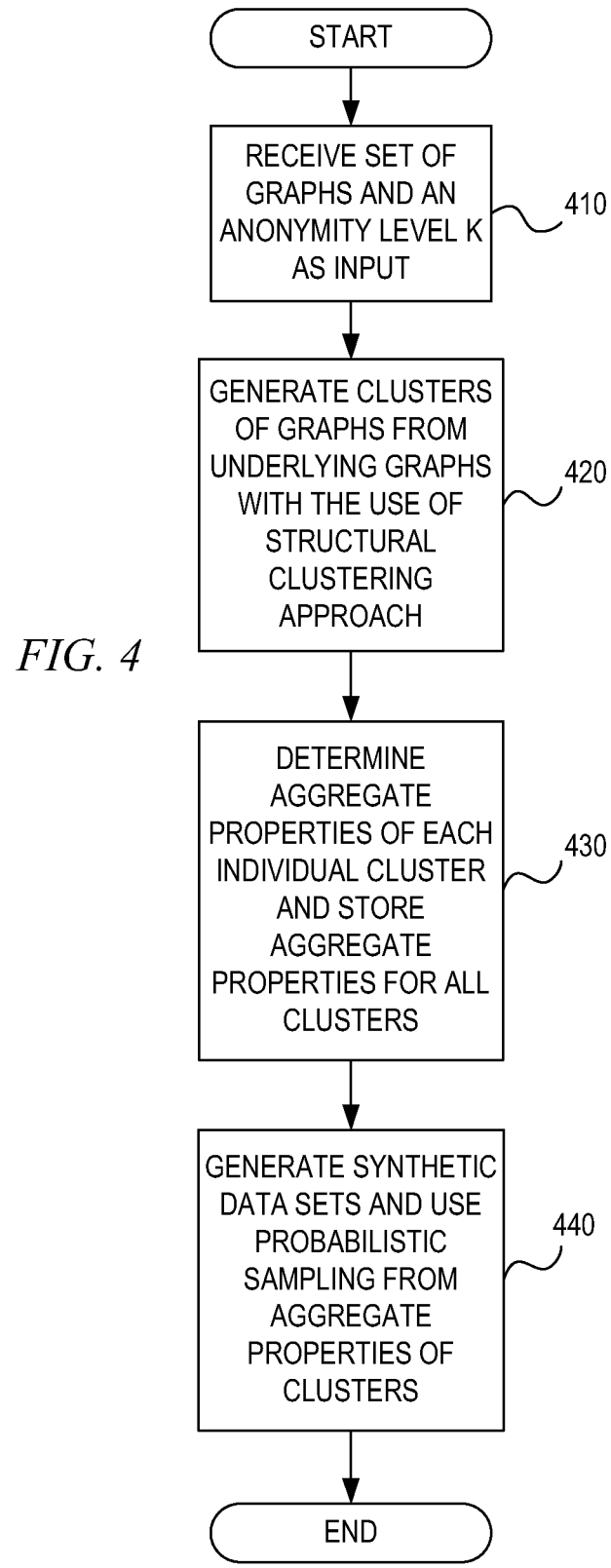
FIG. 4 is an example flowchart outlining an example overall operation for sharing semi-structured data while maintaining privacy of the underlying data.

FIG. 4 is an example flowchart outlining an example overall operation for sharing semi-structured data while maintaining privacy of the underlying data. As shown in FIG. 4, the operation starts with receiving a set of graphs and an anonymity level k as input (step 410). Clusters of graphs are created from the underlying graphs with the use of a structural clustering approach (step 420). Each cluster contains at least k graphs. More detail regarding step 420 will be provided hereafter with reference to FIG. 5.

The aggregate properties of the clusters, e.g., a set of frequent sub-graphs of a given graph collection, are computed and stored for use in generating pseudo-synthetic data sets (step 430). More details regarding step 430 will be provided hereafter with regard to FIG. 6. The synthetic, or pseudo-synthetic, data sets are generated with the use of probabilistic sampling from the aggregate properties of the clusters (step 440). More details with regard to step 440 will be provided hereafter with reference to FIG. 7. Again, since each cluster is tightly knit, the overall aggregate statistics of the data is properly maintained. As noted above, the pseudo-synthetic data sets may be used in conjunction with a wide variety of applications, such as those involving data mining problems which are dependent upon the aggregate properties of the original data sets of the set of original graphs.

Figure 5:
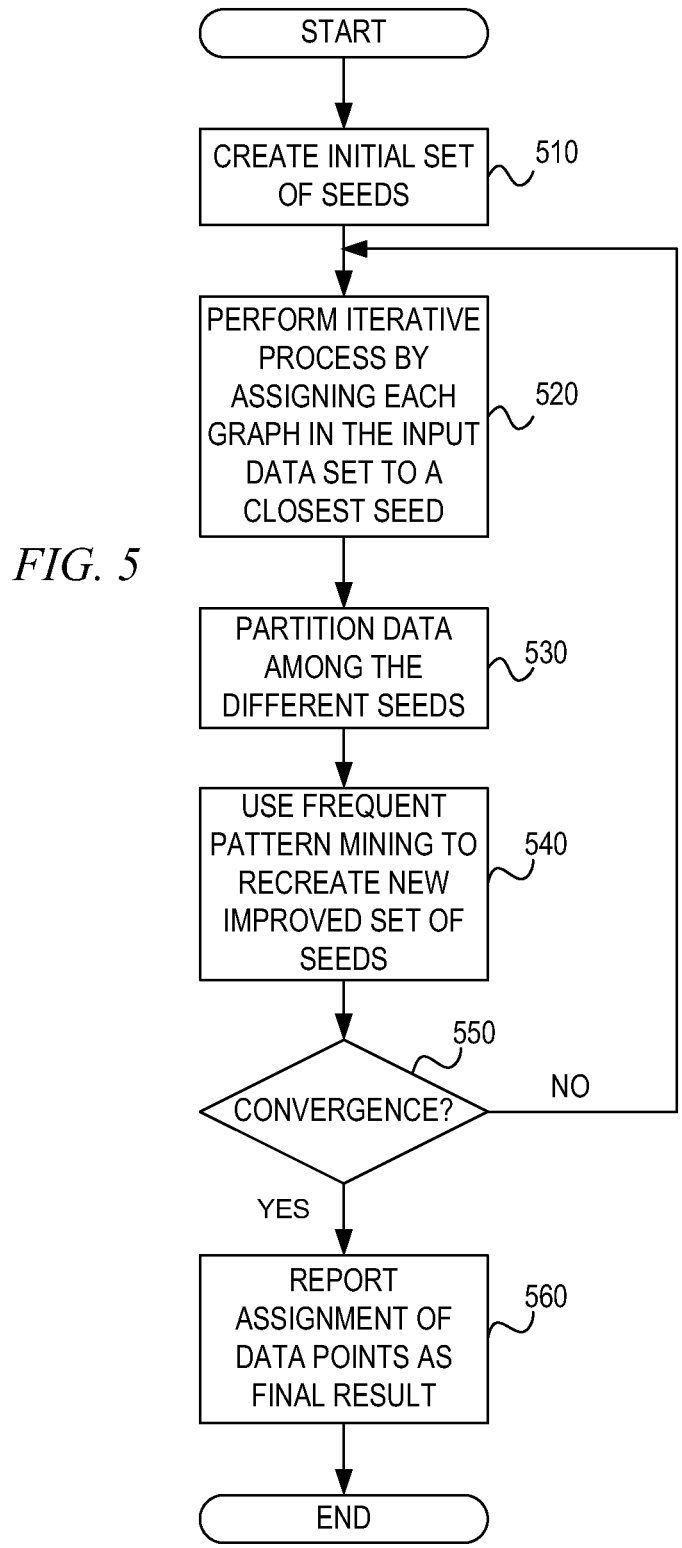
FIG. 5 is an example flowchart outlining an example operation for performing clustering of graphs in order to construct anonymized graph clusters in accordance with one illustrative embodiment.

FIG. 5 is an example flowchart outlining an example operation for performing clustering of graphs in order to construct anonymized graph clusters in accordance with one illustrative embodiment. In order to create the anonymized graphs, one of the inputs to the anonymized graph generation engine is the anonymity level k (received in step 410 in FIG. 4). This anonymity level is used in order to perform the data mining of the underlying graphs. The anonymity level also denotes the constraint for the clustering process. Specifically, the anonymity level denotes the minimum number of records in each cluster.

In order to create such clusters, a partition based clustering approach is followed. Since the anonymity level is k, it follows that each cluster should have at least k members in order to ensure that the anonymity level for any data generated from the cluster is at least k. Therefore, if N is the total number of data points, there can be no more than N/k clusters in the original data set. Therefore, the mechanism of the illustrative embodiment starts with r<=N/k data points as the initial set of seeds to the clustering mechanism. In each iteration, a graph data point is assigned to the closest seed, which has been assigned less than k members so far. If a selected closest seed has already been assigned k or more members, then the graph data point is assigned to a seed that is closest to that selected closest seed which does not have k or more members.

A "closest" seed may be determined in many different ways. In one illustrative embodiment, a distance function is used to determine a closest seed. For example, one could use a distance function that measures the number of common edges between the graphs, i.e. the data point graph and the seed graph, and use this measure to determine a closest seed. Other measures of closeness can also be used either in addition to, or in replacement of, the number of common edges when evaluating a distance function to identify a closest seed. For example, if one wants to compute the distance between a given graph and a set of other graphs, one can determine the number of graphs in the set which are sub-graphs of a particular graph.

The seeds are defined as collections of graphs rather than individual graphs themselves. Therefore, each seed is defined as a set of one or more graphs, where at least one of the seeds has a plurality of graphs associated with it. The technique used to define these sets of one or more graphs will be described in greater detail hereafter. The distance function between the graphs and the seeds are defined in terms of the subset relationships between the seeds and the sub-graphs.

For a given graph, the number of graphs in the seed, which are a subset of the seed, are computed. The larger the number of such subsets, the better the measure of similarity or "closeness." That is, the way in which the clustering is performed is to compute the similarity between the input graphs and the corresponding seeds using the distance function. Each seed contains multiple graphs and each input graph is assigned to its closest seed in order to create the clusters. The concept of "closest" is defined as the number of graphs in the seed which are a sub-graph of the input graph.

Once the assignments of input graphs to the seeds have been performed, the members assigned to each seed are used to refine the seed. Specifically, the frequent sub-graph patterns, i.e. the set of sub-graphs which occur frequently in a plurality of input graphs (see, for example, www.users.cs.umn.edu/~kuram/papers/fsg.pdf), within each group are used for a regeneration process of the seeds. This essentially defines each seed as a set of frequent patterns of the assigned graphs. This iterative process of assignment and seed refinement is repeated in order to improve the quality of the underlying clusters. The process is determined to have converged when the assignment does not change significantly from one iteration to the next.

To summarize, one seed corresponds to each cluster and the seeds are used to create clusters of input graphs. Each input graph is assigned to the closest seed with the frequent sub-graphs in each cluster of input graphs are then used to redefine the seeds. Thus, a circular relationship exists where seeds create clusters and then the clusters are used to recreate better seeds. This is done in an iterative process with continued refinement of the seeds. In one illustrative embodiment, it is determined that the clusters have not changed if the average similarity of input graphs to seeds does not change significantly from one iteration to the next. For example, one can create a threshold of 1% on the difference in similarity from one iteration to the next such that if the difference is not greater than 1%, the process is determined to have converged.

With reference now to FIG. 5, the process for creating the clusters (with cardinality of at least k) starts by creating an initial set of seeds (step 510). This initial set of seeds is sampled from the input data set representing the input graphs. The iterative process of improving the seed sets and the corresponding clusters is started in step 520 where each graph in the input data set is assigned to a closest seed (step 520). Closeness is determined by using a subset operation to check how many sub-graphs in the seed are a subset of the corresponding graph.

The input data set is then partitioned among the different seeds, i.e. a clustering of the input data set to the different seeds is performed, and this partitioning is then used to recreate a new improved set of seeds (step 530). For this purpose, a frequent pattern, or sub-graph, mining mechanism is used to determine the sub-graphs in each partition (step 540). This set of partition-specific sub-graphs redefine the new seed set. It should be noted that each iteration changes the seed set as well as the assignment of the individual data points to the seeds. Over many iterations the assignment is likely to converge in the sense that the quality of the solution is not going to change very much from one iteration to the next. This condition can be tested by defining an objective function in terms of the overall similarity between the data points and the corresponding seeds. When this similarity change is below a predetermined threshold, it can be concluded that the convergence criteria has been satisfied. The quality is essentially defined in terms of the average similarity of the input data points to the seeds. For example, as discussed earlier, the similarity of input graphs to seeds may be defined in terms of the sub-graph relationships with the solution having converged when the value of the solution does not change more than, for example, 1%, from one iteration to the next.

The convergence is then tested (step 550). If the convergence condition is satisfied, then the corresponding assignment of data points to clusters is reported (step 560), such as by displaying, storing, or otherwise outputting the results of process on or in some medium, and the process terminates. Otherwise, the process returns to step 520 in order to repeat the iterative process of refinement of the assignment of the data points to the different clusters. At the end of the process, a set of constrained clusters is obtained such that the cardinality of each cluster is at least equal to the anonymity level k.

Thus, with the above methodology and mechanisms, a constrained clustering mechanism operates on graph data points rather than numerical data points and the resulting clusters are constraint to be of cardinality k, i.e. the anonymity level k. This is different from typical clustering algorithms which cluster data points in a single graph.

Once the clusters have been determined through the above described process, the clusters are used to determine the aggregate statistics of the underlying data. The aggregate statistics include relative frequency information of the edges in the different clusters, and correlation information of the edges in the different clusters, as defined by a coefficient of correlation of the presence of the edges between a pair of graphs. The frequency information of the edges is the number of times that an edge appears in a plurality of graphs. The coefficient of correlation between two edges is statistical definition of the coefficient of correlation, see en.wikipedia.org/wiki/Correlation, for example. The statistics are computed separately for each cluster and are stored separately for each cluster.

Figure 6:
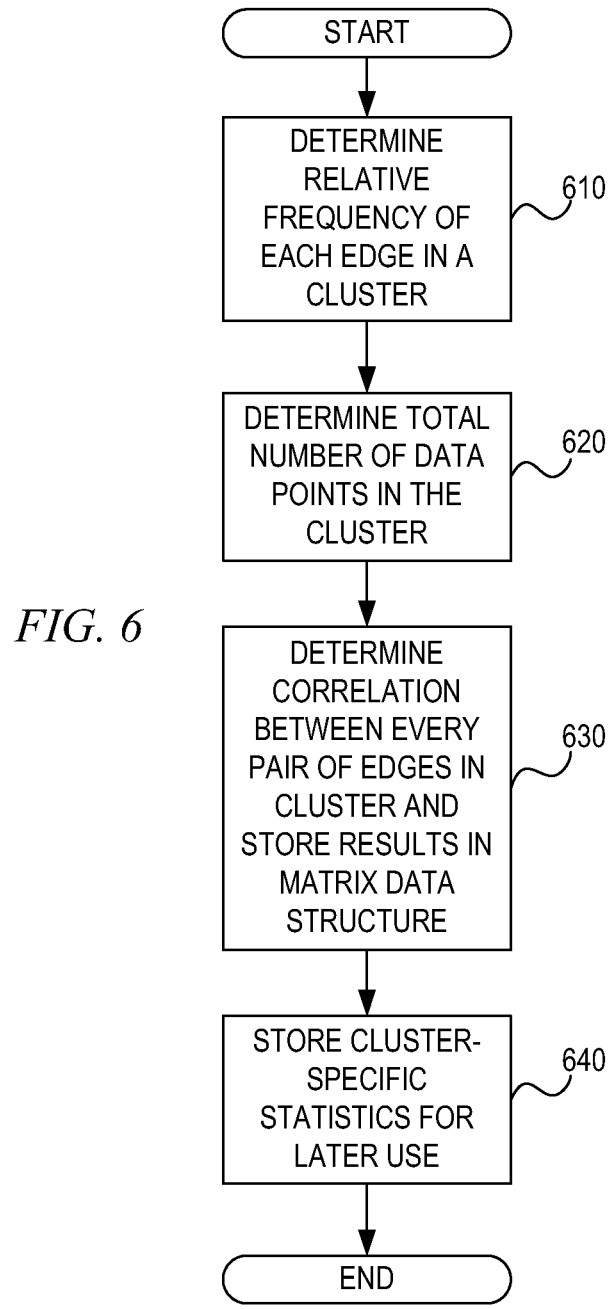
FIG. 6 is an example flowchart outlining an example process for determining aggregate statistics of the underlying data using the clustering described with regard to FIG. 5 above, in accordance with one illustrative embodiment.

FIG. 6 is an example flowchart outlining an example process for determining aggregate statistics of the underlying data using the clustering described with regard to FIG. 5 above, in accordance with one illustrative embodiment. As shown in FIG. 6, the operation starts with the relative frequency of each edge in a cluster being determined (step 610). The total number of data points in the cluster is determined (step 620). The number of data points is useful in computing, for example, the number of synthetic points which should be constructed for each of the clusters, as described hereafter. A correlation between every pair of edges is determined and stored in a matrix data structure (step 630). The cluster-specific statistics, such as those described previously, are stored for later use (step 640) and the operation terminates.

The aggregate statistics determined in FIG. 6 may be used to generate synthetic data for the different clusters. The data for each cluster is used in order to generate the synthetic data for each cluster. The synthetic data for each cluster is generated by using the correlation structure of the edges. Specifically, in one illustrative embodiment, the correlation structure is used to determine the eigenvectors of the corresponding covariance matrix. The process of determining the eigenvectors is well known and is discussed in C. C. Aggarwal et al., "A Condensation Based Approach to Privacy Preserving Data Mining," Proceedings of the EDBT Conference, pp. 183-199, 2004, and C. C. Aggarwal et al., "Finding Generalized Project Clusters in High Dimensional Spaces," ACM SIGMOD Conference, 2000, which are hereby incorporated by reference. The variances of these eigenvectors are used to generate the data points along these eigenvectors.

It should be noted that the process is generating binary data here which corresponds to presence (1) or absence (0) of an edge. However, the eigenvector approach generates continuous data. Therefore, the mechanisms of the illustrative embodiments use rounding on the generated values in order to transform these values to either 0 or 1. This approach is applied to each cluster. The resulting graph set is reported as the final set of synthetic data which can be used for the purposes of private sharing of the final set of synthetic data. For example, a network analyst who attempts to perform an analysis of a network structure may privately share the final set of synthetic data generated by the mechanisms of the illustrative embodiments. In such cases, the synthetic data can be used in order to determine the relevant properties of the network. The synthetic data is not the real data of the input graph data sets and thus, maintains the privacy of the original input graph data sets but maps to the aggregate statistics of the original input graph data sets.

Figure 7:
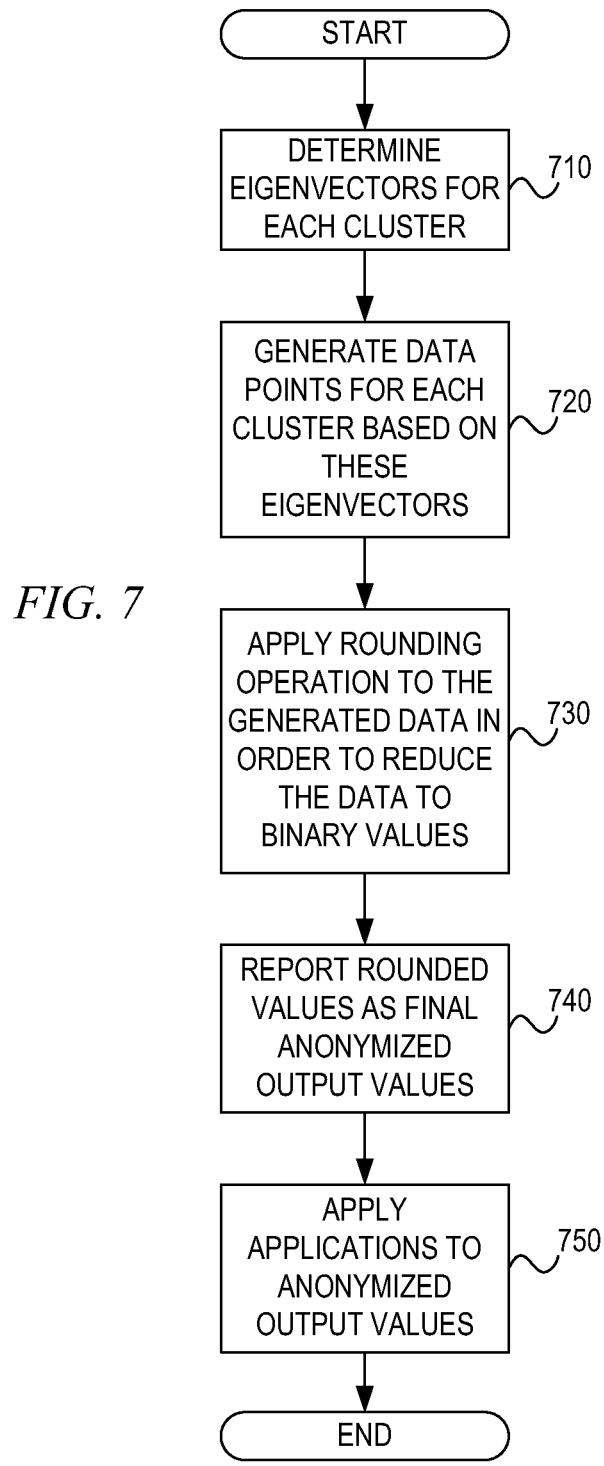
FIG. 7 is an example flowchart outlining an example process of generating synthetic data from aggregate statistics of clusters of graphs in accordance with one illustrative embodiment.

FIG. 7 is an example flowchart outlining an example process of generating synthetic data from aggregate statistics of clusters of graphs in accordance with one illustrative embodiment. As shown in FIG. 7, the process starts by determining the eigenvectors for each cluster (step 710). These eigenvectors are used to generate the data points for each cluster (step 720). Specifically, data points are generated along each eigenvector in proportion to the standard deviation of the data long this vector. The standard deviation of the data long an eigenvector may be determined by computing the square root of the corresponding Eigenvalue. Finally, a rounding operation is applied to the generated data in order to reduce the data to binary values (step 730). These rounded values are then reported as the final anonymized output values (step 740). Thereafter, one or more various applications, such as data mining applications, categorization applications, and the like, may be run or applied to the anonymized output values (step 750) and the operation terminates.

With the mechanisms of the illustrative embodiments set forth above, private structural data, such as network structural data, can be anonymized by using an aggregation process in which clusters of graphs with similar structural characteristics are generated. The aggregate characteristics of this cluster are then determined. These aggregate characteristics are then used to generate new synthetic graphs which retain the characteristics of the original data set. Such an anonymization process has the advantage that it does not use any of the attributes of the original data but it only retains aggregate characteristics. Such aggregate characteristics can be useful in a variety of applications. For example, the mechanism of the illustrative embodiments can be used to generate training models for classification models, such as the classification models described in C. C. Aggarwal et al. "XRules: A Framework for Structural Classification of XML Data," ACM KDD Conference, 2003. The applicability of the mechanisms of the illustrative embodiments is not restricted to classification techniques, however, but can be used with any data mining mechanism which uses the aggregate characteristics of the underlying data.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system having a processor, for anonymizing data comprising a plurality of graph data sets, comprising:

receiving, by the processor of the data processing system, input data comprising a plurality of graph data sets, wherein each graph data set comprises data for generating a separate graph from graphs associated with other graph data sets;

performing, by the processor, clustering on the graph data sets to generate a plurality of clusters, wherein at least one cluster of the plurality of clusters comprises a plurality of graph data sets and wherein other clusters in the plurality of clusters comprise one or more graph data sets;

determining, by the processor, for each cluster in the plurality of clusters, an aggregate property of the cluster;

generating, by the processor, for each cluster in the plurality of clusters, synthetic data representing the cluster, from the determined aggregate properties of the clusters; and executing, by the processor or another computing device, one or more applications on the synthetic data to perform an operation on the synthetic data while preserving a privacy aspect of the input data.

2. The method of claim 1, further comprising receiving, by the processor, an anonymity level value k, wherein each cluster in the plurality of clusters comprises at least k number of graphs.

3. The method of claim 1, wherein the aggregate property of the cluster comprises a set of frequent sub-graphs of the cluster.

4. The method of claim 1, wherein performing clustering on the graph data sets to generate a plurality of clusters comprises:
  creating an initial set of seed graphs; and
  assigning, for each graph in the input data, the graph to a closest seed graph to generate an initial plurality of clusters.

5. The method of claim 4, wherein performing clustering on the graph data sets to generate a plurality of clusters further comprises:
  iteratively performing a process comprising:
    using a frequent pattern mining operation on the initial plurality of clusters to recreate a new improved set of seed graphs;
    determining if the process has reached a convergence state; and
    in response to the process not having reached a convergence state, assigning graphs in the input data to a closest seed graph in the improved set of seed graphs.

6. The method of claim 1, wherein determining, for each cluster in the plurality of clusters, an aggregate property of the cluster comprises determining a relative frequency of each edge in the cluster, wherein the relative frequency is a measure of a number of times that an edge appears in each of the graphs of the cluster.

7. The method of claim 6, wherein determining, for each cluster in the plurality of clusters, an aggregate property of the cluster further comprises:
  determining a correlation between every pair of edges in the cluster as defined by a coefficient of correlation of the presence of the edges between a pair of graphs in the cluster; and
  storing results of determining the correlation between every pair of edges in a correlation matrix data structure.

8. The method of claim 7, wherein generating, for each cluster in the plurality of clusters, synthetic data representing the cluster comprises:
  generating eigenvectors of a corresponding covariance matrix based on the correlation matrix data structure; and
  generating synthetic data for each cluster in the plurality of clusters based on the generated eigenvectors.

9. The method of claim 8, wherein generating synthetic data for each cluster in the plurality of clusters based on the generated eigenvectors comprises:
  generating data points for each cluster based on the eigenvectors;
  applying a rounding operation to the data points generated based on the eigenvectors to thereby generate binary values based on the data points generated based on the eigenvectors; and
  reporting the binary values as an anonymized data set for the input data.

10. The method of claim 9, further comprising:
  executing one or more applications on the anonymized data set to perform an operation on the anonymized data set, wherein the operation is one of a data mining operation or a classification operation.

11. A computer program product comprising a non-transitory computer readable storage medium having a computer readable program recorded thereon, wherein the computer readable program, when executed on a computing device, causes the computing device to:
  receive input data comprising a plurality of graph data sets, wherein each graph data set comprises data for generating a separate graph from graphs associated with other graph data sets;
  perform clustering on the graph data sets to generate a plurality of clusters, wherein at least one cluster of the plurality of clusters comprises a plurality of graph data sets and wherein other clusters in the plurality of clusters comprise one or more graph data sets;
  determine for each cluster in the plurality of clusters, an aggregate property of the cluster;
  generate for each cluster in the plurality of clusters, synthetic data representing the cluster, from the determined aggregate properties of the clusters; and
  execute, by the processor or another computing device, one or more applications on the synthetic data to perform an operation on the synthetic data while preserving a privacy aspect of the input data.

12. The computer program product of claim 11, wherein the computer readable program further causes the computing device to receive an anonymity level value k, wherein each cluster in the plurality of clusters comprises at least k number of graphs.

13. The computer program product of claim 11, wherein the aggregate property of the cluster comprises a set of frequent sub-graphs of the cluster.

14. The computer program product of claim 11, wherein the computer readable program causes the computing device to perform clustering on the graph data sets to generate a plurality of clusters by:
  creating an initial set of seed graphs; and
  assigning, for each graph in the input data, the graph to a closest seed graph to generate an initial plurality of clusters.

15. The computer program product of claim 14, wherein the computer readable program causes the computing device to perform clustering on the graph data sets to generate a plurality of clusters further by:

iteratively performing a process comprising:
  using a frequent pattern mining operation on the initial plurality of clusters to recreate a new improved set of seed graphs;
  determining if the process has reached a convergence state; and
  in response to the process not having reached a convergence state, assigning graphs in the input data to a closest seed graph in the improved set of seed graphs.

16. The computer program product of claim 11, wherein the computer readable program causes the computing device to determine, for each cluster in the plurality of clusters, an aggregate property of the cluster by determining a relative frequency of each edge in the cluster, wherein the relative frequency is a measure of a number of times that an edge appears in each of the graphs of the cluster.

17. The computer program product of claim 16, wherein the computer readable program further causes the computing device to determine, for each cluster in the plurality of clusters, an aggregate property of the cluster by:
  determining a correlation between every pair of edges in the cluster as defined by a coefficient of correlation of the presence of the edges between a pair of graphs in the cluster; and
  storing results of determining the correlation between every pair of edges in a correlation matrix data structure.

18. The computer program product of claim 17, wherein the computer readable program further causes the computing device to generate, for each cluster in the plurality of clusters, synthetic data representing the cluster by:
  generating eigenvectors of a corresponding covariance matrix based on the correlation matrix data structure; and
  generating synthetic data for each cluster in the plurality of clusters based on the generated eigenvectors.

19. The computer program product of claim 18, wherein the computer readable program further causes the computing device to generate synthetic data for each cluster in the plurality of clusters based on the generated eigenvectors by:
  generating data points for each cluster based on the eigenvectors;
  applying a rounding operation to the data points generated based on the eigenvectors to thereby generate binary values based on the data points generated based on the eigenvectors; and
  reporting the binary values as an anonymized data set for the input data.

20. An apparatus, comprising:
  a processor; and
  a memory coupled to the processor, wherein the memory comprises instructions which, when executed by the processor, cause the processor to:
  receive input data comprising a plurality of graph data sets, wherein each graph data set comprises data for generating a separate graph from graphs associated with other graph data sets;
  perform clustering on the graph data sets to generate a plurality of clusters, wherein at least one cluster of the plurality of clusters comprises a plurality of graph data sets and wherein other clusters in the plurality of clusters comprise one or more graph data sets;
  determine for each cluster in the plurality of clusters, an aggregate property of the cluster;
  generate for each cluster in the plurality of clusters, synthetic data representing the cluster, from the determined aggregate properties of the clusters; and
  execute, by the processor or another computing device, one or more applications on the synthetic data to perform an operation on the synthetic data while preserving a privacy aspect of the input data.

* * * * *